H. B. COATS.
SECTIONAL PNEUMATIC TIRE.
APPLICATION FILED JUNE 26, 1916.

1,311,806.

Patented July 29, 1919.
2 SHEETS—SHEET 1.

INVENTOR
HENRY B. COATS
BY Lockwood
Lockwood
ATTORNEYS

H. B. COATS.
SECTIONAL PNEUMATIC TIRE.
APPLICATION FILED JUNE 26, 1916.
1,311,806.
Patented July 29, 1919.
2 SHEETS—SHEET 2.
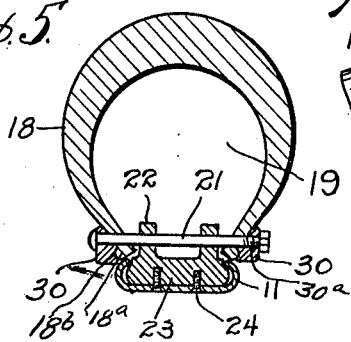
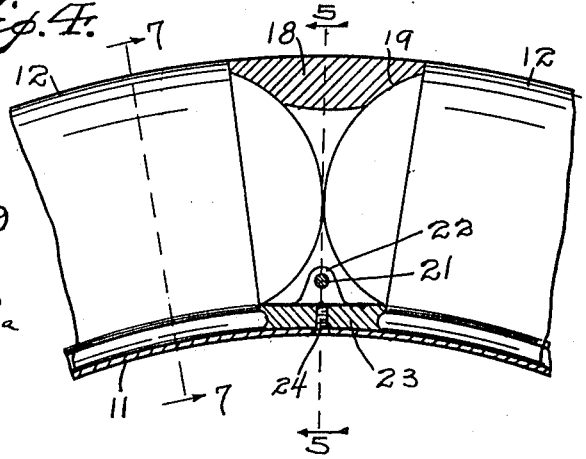
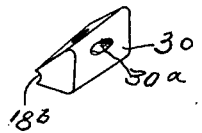
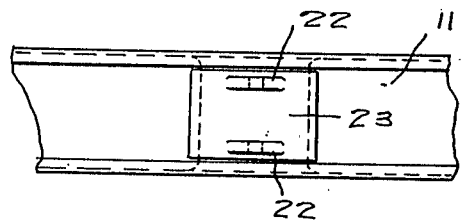
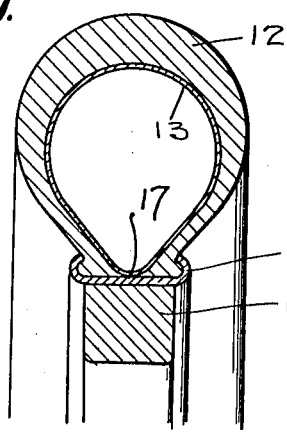
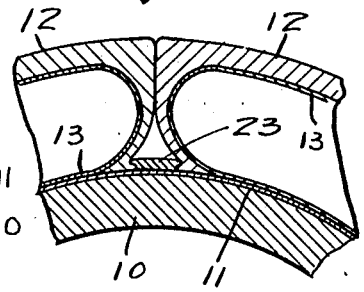
INVENTOR
HENRY B COATS
BY
Lockwood & Lockwood
ATTORNEYS

UNITED STATES PATENT OFFICE.

HENRY B. COATS, OF VEEDERSBURG, INDIANA.

SECTIONAL PNEUMATIC TIRE.

1,311,806. Specification of Letters Patent. Patented July 29, 1919.

Application filed June 26, 1916. Serial No. 105,967.

*To all whom it may concern:*

Be it known that I, HENRY B. COATS, a citizen of the United States, and a resident of Veedersburg, county of Fountain, and State of Indiana, have invented a certain new and useful Sectional Pneumatic Tire; and I do hereby declare that the following is a full, clear, and exact description thereof, reference being had to the accompanying drawings, in which like letters refer to like parts.

The object of this invention is to economize in the cost of maintenance of pneumatic tires for automobiles and the like. In the construction heretofore in general use the outer casings and the inner tubes are all annular and continuous. If they be defective or if they be accidentally punctured or otherwise injured at any point, often the entire outer casing or tube must be torn away. The usual remedy is to vulcanize the same, but vulcanized repairs, particularly of outer casings, are short lived and of little value. A feature, therefore, of this invention consists chiefly in making a pneumatic tire in sections. The chief feature of this invention consists in making both the outer casing and the inner tube in independent sections so that if they be injured at one point, the particular section where the injury occurs can, if desired, be removed and replaced by another section, all of the remaining sections being undisturbed and unchanged, and, therefore, safe from loss.

Along with the foregoing feature of the invention is the provision of means for holding, covering and protecting the joints between the adjacent ends of the tire sections so as to give a smooth tread to the tire or wheel.

Figure 1:
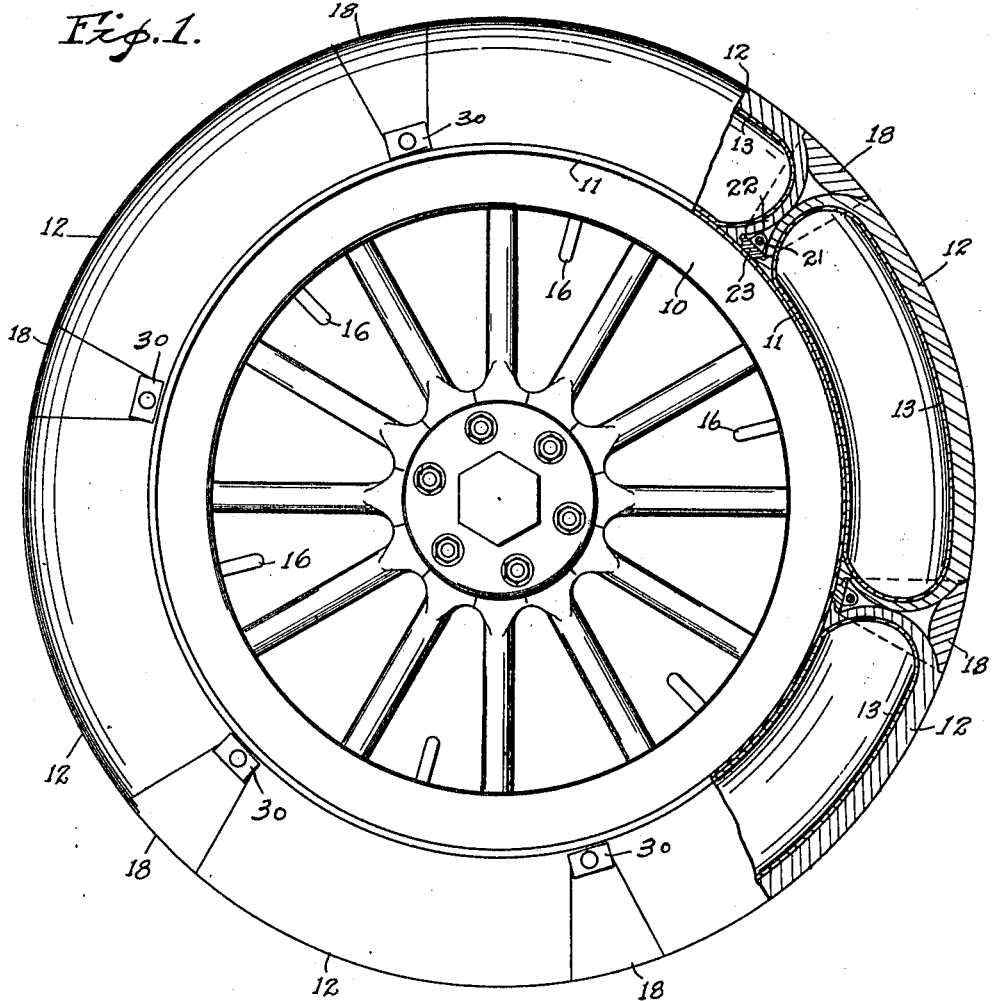
Figure 2:
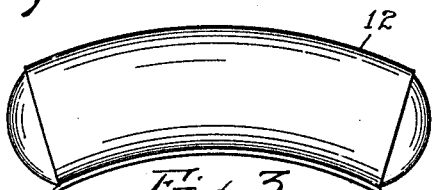
Figure 3:
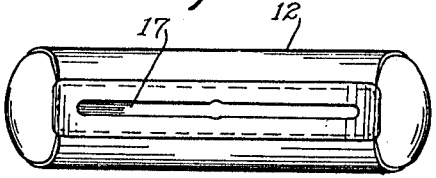

The full nature of the invention will be understood from the accompanying drawings and the following description and claims:

In the drawings, Figure 1 is a side elevation of an automobile wheel equipped with said sectional tire, the tire being shown partially in longitudinal central radial section. Fig. 2 is a side elevation of one of the tire sections. Fig. 3 is an inside elevation thereof. Fig. 4 is a longitudinal section, a portion of the tire including parts of two sections and the intermediate member, the same being on an enlarged scale. Fig. 5 is a section on the line 5—5 of Fig. 4. Fig. 6 is an inside view of the clencher rim and means for securing thereto the intermediate member between tire sections. Fig. 7 is a section on the line 7—7 of Fig. 4, showing a portion of the tire in inside elevation. Fig. 8 is a detail view showing the clamping block used to secure the ends of the filler member. Fig. 9 is a longitudinal central section through a tire and clencher rim showing a modified form.

There is shown herein an automobile wheel of unusual construction and having a wooden rim 10. Upon it is mounted the usual demountable metal or clencher rim 11. These parts of the wheel may be of any desired construction, as the invention relates chiefly to the tire construction.

The tire is sectional, that shown consisting of six sections, and each section consists of an outer casing 12 with an inner tube 13. Each section is supplied with air from the usual air valve 16, so that there is one air valve for each section. The outer casing 12 may be made in cross section in the usual way, or in any desired form. The ends of the outer casing section 12 are rounded or oval. The inner tube 13 is of usual type excepting it is sectional, its size being suitable for the sectional outer casing in which it is located. Each outer casing section has a longitudinal slit 17 through which the inner tube is inserted in collapsed form.

When all the tire sections are mounted on a wheel, their ends abut against each other in succession so that there is a space between the treads of each pair of adjacent sections. This space is filled by an intermediate member or filler 18 made of rubber or other yielding material. Its shape in cross section, as shown in Fig. 5, is substantially the same as the cross section of an outer casing. Its opposite sides are concave at 19 so as to fit on the convex surfaces of adjacent ends of the outer sections. In order to make a satisfactory fit between the end of a tire section and a filler 18, the end of the tire section is provided with an annular shoulder 20, the shoulder lying between the rounded end of the tire section and the body thereof. The lateral ends or edges of the filler are formed so as to fit against its shoulder snugly, as shown in Fig. 4.

The filler is held in place by the means shown in Fig. 5, where there is a bolt 21 extending through the flanges or beads of the filler and also through two ears 22 extending up from a metal block 23 which is secured by the screws 24 in the clencher rim 11.

The edges of the filler 18 adjacent the clencher rim 11 are provided with flanges or beads 18ᵃ and coöperating with said beads 18ᵃ are channels 18ᵇ formed in the apex edges of side blocks 30 which are substantially tri-angular in cross section, one tapered face of each block resting against the outer face of the filler.

The blocks 30 have transverse openings 30ᵃ which are so located that the bolt 21, which extends through said openings, passes exteriorly of the beads 18ᵃ on the filler.

After the sections of the tire and the fillers are mounted on the wheel, the sections are expanded and the longitudinal expansion or internal air pressure will force the adjacent ends of the sections against each other and against the filler and will spread and hold out the filler in its expanded form and so that the tread of the filler will be flush with the tread of the tire sections. This will give an even tread to the tire and the filler will yield under external pressure the same as the tire sections and will assume one position not only because of the resiliency of the filler, but from the expansion and resiliency of the ends of the tire sections which extend into the filler.

If one section for some reason becomes defective, it can be removed and another section put in its place and the remainder of the tire left undisturbed. The removal and replacement of a section of a tire will be much less laborious and annoying than the removal of an entire tire, for the wheel can be turned to bring said defective section uppermost and then it can be removed without any trouble from the muddy roadway and in fact the wheel need not be jacked up, but left standing on the ground, as the inflated sections will maintain the weight of the car or load while the defective section is being removed and replaced. When the defective section is deflated, it can be readily removed from the rim and will not give the trouble experienced in removing an annular tire from the rim. The fillers coöperate with the ends of the outer casings for holding them in place on the clencher rim.

The sides of the metal block 23 are raised transversely of the tire, as shown in Fig. 4, so as to serve as a clenching member for engaging the bead extension at the ends of the tire sections. The ends of the tire sections, as shown in Fig. 3, have transverse beads similar to the lateral beads and in this way the clenching member 23 serves to hold the tire sections in place, whether there is a filler or not.

In Fig. 9 a modified form of the invention is shown, omitting the filler. The ends of the tire sections are not made oval, but flat so that they abut squarely against each other and make a filler unnecessary. The ends of the tire sections are held in place by the clenching member 23 and the beads across the ends of the sections, as above explained.

The invention claimed is:

1. The combination with a vehicle wheel having a clencher rim, of a tire composed of flexible cushions with their ends abutting successively, the ends of said sections having transverse beads, a filler overlapping the meeting ends of the cushions, a plate between each pair of cushions having recesses in its edges for engagement with said beads, outwardly extending ears on said plate, a block at each side of each filler strip and bearing against the free ends thereof, and a bolt extending transversely through said blocks, ends of the filler and said ears, for locking the filler in position.

2. The combination with a vehicle wheel having a clencher rim, of a tire composed of flexible pneumatic cushions with their ends abutting successively, each cushion including an outer casing adapted to fit in said clencher rim and an inner tube wholly inclosed in said cushion, the ends of said outer cushions being oval and formed to leave a shoulder between the body of the outer cushions and the end thereof, a filler surrounding the oval ends of the adjacent sections and abutting against the shoulders thereon and flush with the tread of the tire cushion, a plate section in the rim extending from one cushion to the other and interlocking therewith, said plate having outwardly extending ears, a side block at each edge of the filler and a bolt adapted to extend transversely in a horizontal plane through the inner ends of the filler, side blocks and said ears for securing the filler to the rim.

3. The combination with a vehicle wheel having a clencher rim, of a tire composed of flexible cushions with their ends abutting successively, the ends of said sections having transverse beads, a filler overlapping the meeting ends of the cushions, the rim engaging ends of said filler having outwardly projected beads, a plate between the ends of each pair of cushions and interlocking therewith, ears projecting outwardly from said plate, blocks bearing against the free ends of said filler and substantially triangular in cross section, the apex of each block having a channel for engagement with the bead of the filler, and a bolt extending transversely through said block, filler and ears on the plate and exteriorly of said beads.

In witness whereof, I have hereunto affixed my signature.

HENRY B. COATS.

Copies of this patent may be obtained for five cents each, by addressing the "Commissioner of Patents, Washington, D. C."